May 28, 1957
E. T. ARMSTRONG
2,793,677
LAMINATING APPARATUS
Filed June 16, 1955
2 Sheets-Sheet 1
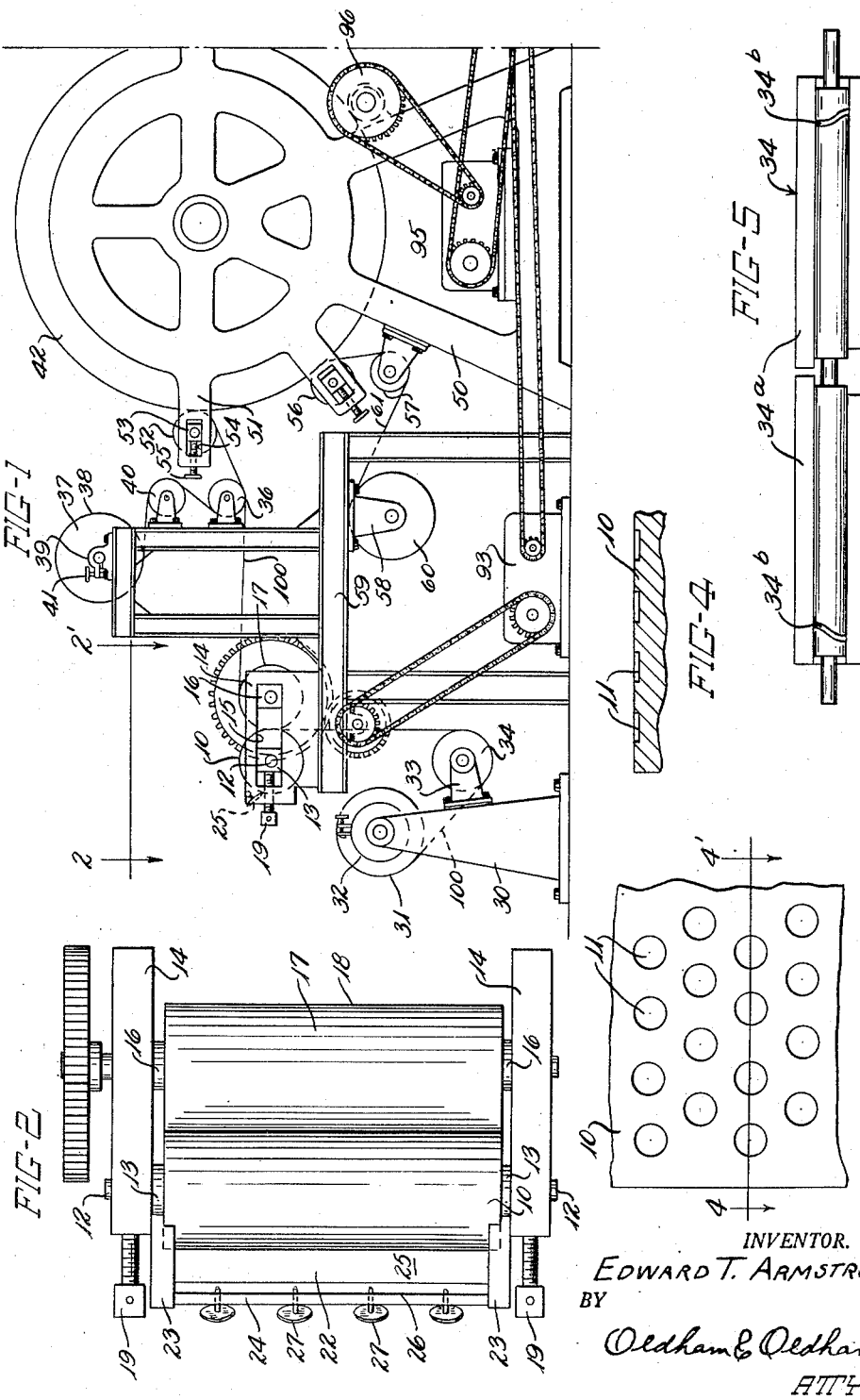
INVENTOR.
EDWARD T. ARMSTRONG
BY
Oldham & Oldham
ATTYS-

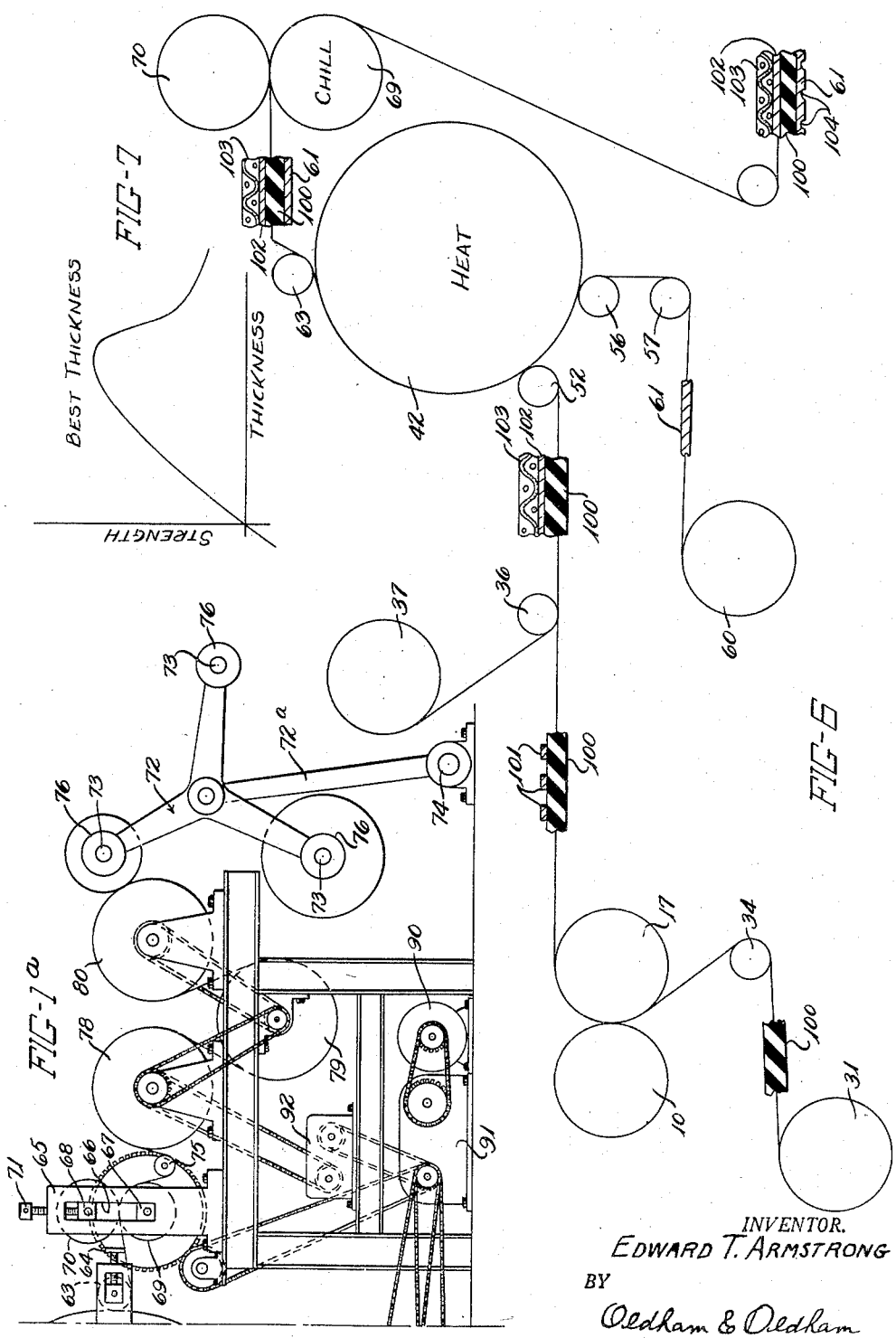

United States Patent Office 2,793,677
Patented May 28, 1957

2,793,677

LAMINATING APPARATUS

Edward T. Armstrong, Cupsaw Lake, N. J.

Application June 16, 1955, Serial No. 515,893

3 Claims. (Cl. 154—37)

This invention relates to the manufacture of compound sheet materials or laminates in which a layer of thermo-plastic material is permanently mounted on a backing of woven cloth, paper, or similar strength giving material. The invention is especially useful in the manufacture of wallpaper, upholstery, and other decorative fabrics having a washable moisture-proof, wear-resisting, surface layer of thermo-plastic material such as polyvinylchloride or polyester film.

Heretofore in the manufacture of such compound fabrics or laminates, it has been attempted to calender the plastic faving directly onto the face of a cloth backing. Such a procedure has not been found entirely satisfactory as the thin plastic material has been difficult to control on the calender machines and the bond between the plastic face layer and the fabric backing has been non-uniform and of poor quality. In addition, the calendered product is inflexible in color selection and is difficult to decorate.

It has been proposed to form the plastic face layer separately, as by calendering or by film forming by deposit from a solution or dispersion of the plastic material onto a metal belt, and to adhere such a layer to a fabric backing by a layer of cement applied thereto. Such a method while sometimes providing a good article, has been found to be uncertain in the quality of the article produced as the bond between the plastic facing and the fabric has been of variable quality.

It is an object of the present invention to overcome the difficulties heretofore experienced in the production of such compound fabrics and to provide a superior apparatus for laminating.

These and other objects will appear from the following description, reference being had to the accompanying drawings.

Of the drawings:

Fig. 1 is a side elevation of an apparatus for carrying out the invention,

Fig. 1a is a continuation of Fig. 1,

Fig. 2 is a plan view of the coating mechanism taken on line 2—2' of Fig. 1,

Fig. 3 is an enlarged fragmental face view of the engraved roller 10,

Fig. 4 is a sectional view, taken on line 4—4' of Fig. 3,

Fig. 5 is a detail view of one of the spreader rolls,

Fig. 6 is a diagram showing the progressive construction of the material, and

Fig. 7 is a diagram showing the relation of thickness of cement layer to strength of bonding.

Referring to the drawings which show an embodiment of my invention, the numeral 10 designates a friction-power-driven metal roll having a cylindrical face engraved to provide a field of similar cavities 11 arranged in spaced apart relation and preferably along parallel lines in three directions so that the cavities have their centers arranged in equilateral triangular formation equally spaced from one another. Each cavity is of a precisely determinate diameter, depth and spacing for reasons hereinafter discussed.

The roll 10 has trunnions 12 which are supported to rotate freely in bearings 13 mounted for sliding movement in slots or guideways 15 of a supporting frame 14. A second roller 17 is rotatably mounted in bearings 16 secured to the frame. The arrangement is such that roller 10 may be adjusted along the guideways toward and from the roller 17 and for so adjusting roller 10, tension screws 19 are threaded through frame 14 and impinge against bearings 13.

The roller 17 has a resilient cushion face 18 preferably of vulcanized rubber, for pressing a web of sheet material against the roller 10. The arrangement is such that a pressure of at least 250 lbs. may be applied by each screw to the meeting roll faces.

It is preferred to drive the roll 10 frictionally from the roll 17, means being provided as hereinafter described for driving the roller 17 at a determinate speed and, roll 10 being driven merely by surface contact of the roll with the sheet material about roller 17.

The purpose of the roller 10 is to apply a determinate arrangement of deposits of plastic cementing material to a web of sheet material and for this reason, the cavities are precisely made of such size and spacing as to deposit the cementing material in evenly distributed amount which upon being subjected to pressure in contact with a second layer of material will be crushed to a substantially continuous layer of optimum thickness for providing a bond between the two layers.

For forming the deposits in the cavities, a trough 22 is provided adjacent the face of roller 10 and movable therewith and comprises end members 23 journaled on the trunnions of roll 10, a rod 24 mounted therebetween for rotatably and translatably supporting a doctor blade 25. A second rod 26 extends between the end members 23 for holding them in spaced apart relation and a plurality of screws 27 are threaded through the rod 26 to engage the doctor blade at intervals and hold it against the roll face.

Mounted near the roll 10 is a roll support 30 having roll chucks for supporting a roll 31 of paper, sheet polyvinylchloride or similar plastic, or combination of such materials. A band brake 32 is provided on the roll support to provide a drag on the material. Also rotatably mounted on brackets 33 between the roller 10 and the roll 31 is a spreader roll 34 of the type illustrated in Fig. 5 in which a plurality of staves 34a are moved outwardly by stationary cam grooves 34b as the sheet material rotates the roller. The sheet material unwound from the roll 31 passes about spreader roller 34 and between the bight of rolls 10 and 17 where it adheres to and lifts the deposits from the cavities of roll 10.

The sheet material carrying the deposits is drawn through a reach or string 35 to a similar spreader roller 36. A roll 37 of backing fabric, or of plastic material 38 is mounted on roll chucks 39 and is delivered under tension about an idler roller 40 and spreader roller 36. Chucks 39 are equipped with a tension brake 41. The purpose of the idler roller 40 is to deflect the sheet so as to cause it to span a greater arc of contact of the spreader roller 36. At the face of the spreader roller 36 the plastic sheet and the backing from roll 37 are united face to face and the spaced deposits of plastic are flattened and coalesce to form a film of adhesive. The plied material is then drawn on to a large cylindrical heated drum 42 rotated by a suitable drive as hereinafter described.

The purpose of the drum 42 is to provide a prolonged action, precisely temperature-controlled, continuous heating surface. It acts as a heat source to raise the contacting plastic surface to essentially drum temperature. Then the drum feeds heat into the plastic at a rate determined by the thermal diffusivity of the plastic.

The drum 42 is rotatably mounted on pedestals 50. Mounted also on the pedestals are supports 51 for a pressure roller 52 rotatably mounted in bearings 53. Bearings 53 are movable radially of the drum in slots 54 of the supports and are engaged by pressure screws 55. The plied material enters the bight between roller 52 and the face of the drum 42.

Temperature gradients in the drum-plastic interface are minimized by high and uniform application pressure at roller 52. These pressures serve to eliminate an interfacial film of entrained air.

A plastisol deposit, such as that applied by printing at roll 10 becomes less viscous initially on heating. However, as it is retained at an elevated temperature for a period of time, its viscosity begins to increase. At adequately high temperatures the viscosity may change rapidly and suddenly after a heating period. It is understood that during continued heating, a polymerization of the plastisol takes place and the phenomena of changing viscosity is dependent upon the composition of the plastisol. In addition to the plastic material such as polyvinyl chloride resin and its plasticizer, the plastisol material may contain a catalyst, such as benzoyl peroxide, inhibitor such as a metallic oxide, for example copper oxide, or an organic inhibitor, such as hydroquinone and a viscosity modulator such as sodium chloride or other inorganic salt. Also, although a plastisol is supposed to be free from solvents, a very small percentage of a solvent may be present.

Too rapid an increase in viscosity could prevent the cavities in the roll 10 properly releasing the material and this may be controlled by varying the amount of viscosity modulator in the plastisol.

The polymerization of the plastic material is the object of the heating drum 42.

In some cases, to provide a fine finish on the plied material and to provide a transparent protective coating thereon, a second pressure roll 56 is mounted adjacent the drum 42 and has similar means for pressing it toward the drum face. A spreader roll 57 is rotatably mounted on the frame 50 and a pair of roll chucks 58 are mounted on a frame 59 in position to support a roll 60 of transparent thin sheet plastic for delivery about the spreader roller 57 and, to the bight of the pressure roller 56 and the face of the drum 42. The sheet material 61 is laid on the drum in advance of the plied material which meets it at the bight of roller 52 and drum 42.

It has been found that where the system viscosity is too low as it is pressurized, poor bonding results. It has also been found that too high a viscosity or set will reduce the bond. From this it is apparent that the plastisol characteristics define a preferred operating speed and deposit thickness. The system temperature is limited usually by permissible plastic processing temperatures. For this reason the sheet material 61 may to advantage be a polyester film which withstands much higher temperatures than vinyl plastics. Also other advantages, such as faster production and improved product result from use of polyester film as the layer 61.

The plied material passes from the roller 52 about the face of drum 42 to a position where after a period of heating, to provide polymerization thereof, it is removed from the drum.

For removing the material from the drum, and chilling and embossing the sheet material, a frame 65 is provided in which are vertical slots 66 for receiving pairs of bearings 67, 68. Bearings 67 are fixed to frame 65 and rotatably support a roller 69. A pressure roller 70 is rotatably mounted in bearings 68 which are adapted to slide in the frame 65 and are pressed toward roller 69 by pressure screws 71. A pressure roller 63 is mounted on frame 50 for engaging the material on the face of drum 42 at the position where the material leaves the drum. It is metallic and is adjustable in position near the drum face by means of screws 64.

The material leaves the drum 42 at the roller 63 and is drawn from the drum by rollers 69, 70 which grip the sheet material between them. Roller 69 is of metal and of hollow construction and is provided with the usual slip joint pipe connection for circulating a refrigerated fluid therethrough. The face of the roller 69 may be of plain, matted, embossed or other surface configuration to impress the surface of the plastic material with a design.

In order to provide adequate cooling of the material as it passes about roller 69, means such as an idler roller 75 is provided to deflect the material and cause it to pass for an angle of contact of at least 90 degrees about the roller 69. The cooperating roller 70 has a smooth operating face of rubber or paper. If the roll 70 is water cooled or other refrigeration therefor is provided, the face of rubber or other non-metallic material is made relatively thin. As the roller 69 is chilled by refrigeration any impression made by it in the plastic is permanent, as the warm plastic material is chilled as it is impressed.

As the sheet material leaves these rollers 69, 70 it is wound into rolls and for the purpose of accomplishing this expeditiously, a continuous windup ferris wheel reel 72 is provided having three equidistant pairs of arms supporting opposed roll chucks 73.

To provide further cooling of the sheet material, a series of can-type cooling drums 78, 79, 80 is provided and the sheet material leaving the roller 69 is looped about the drums 76, 77, 78, 79 in succession.

The reel 72 is mounted upon a swing frame 72a pivotally mounted at 74 to swing toward and frame the drum 80. The arrangement is such that a roll shell 76 may rest upon the face of drum 80 with the frame 72a inclined toward the drum and the frame will still be inclined slightly in the same direction when the shell has been built up to a full roll. At that point, the frame 72a may be swung outwardly to permit the next shell to be placed against the drum, the reel 72 being rotated accordingly.

The shells 76 are frictionally driven by contact with the material on the drum 80. When a shell 76 is filled, the material is cut and started on the next shell. For starting the material about the shells, the shells have a continuous band of pressure sensitive adhesive at each end thereof to adhere to the sheet material and start it about the shell.

To provide for driving the aforedescribed mechanism while controlling stretch, relaxation repeat, shrinkage, etc. of the material it is preferred to drive the embossing rollers 69, 70 directly and to provide for the variable speed driving of the other rollers from the same power source. To this end a power source such as a motor 90 is provided, preferably of the variable speed type and suitable speed changer 91 is provided between it and the roller 69 to drive the embossing rolls at the desired range of speeds. Two speed changers 92, 93 are also driven by the power source 90 and a speed reducer 95 is also driven therefrom.

Speed reducer 95 drives the drum 42 through suitable gearing 96. Speed reducer 92 drives the cooling drums 78, 79, 80 and speed reducer 93 drives the print-coater roller 17. By means of the speed reducers 91, 92, 93, and 95 the speed of the various elements may be adjusted to provide the desired results.

It has also been found that the operating speed is independently critical. Thus at too low or too high a speed, the bond is diminished. This is thought to be a function of the setting or polymerization characteristics of typical adhesives. They must be dried just right before making up a joint in order to develop optimum strength.

It has been found that where it is attempted to unite a layer of polyvinylchloride plastic material to a cloth backing by an intervening layer of plastic cement, strength of the bond between the plastic and the fabric is critical as to thickness of the cement layer and that there is an optimum thickness of cement layer at which the strongest bond occurs. This is illustrated in Fig. 7 where it will be seen that the curve representing bonding strength has a decided peak showing that with a cement thickness too thin, the bond is weak and at a cement thickness too thick, the bond is also weak. The optimum thickness may be found by experiment and the roller 10 is then engraved as illustrated in Figs. 3 and 4 so that the recessed portions 11 of the roller are equally distributed and their total area equals about one-half of the area of roller face and their depth is equal to about three times the desired thickness of the cement layer. This will result, having reference to the diagrammatic showing of Fig. 6, in the printing or depositing upon the sheet material 100 from roll 31 of a field of spaced apart deposits 101 each having a thickness of twice the optimum cement layer whose total area is one-half the entire surface. Upon leaving the rollers 10, 17 these deposits will start to merge together or coalesce and will form a uniform layer 102 of cement of proper and optimum thickness between the layer 100 and the backing layer 103 from roll 37 as the assembled layers reach the bight of roller 52 and drum 42. As the plied material passes about the heated drum 42, the bond becomes set and the material is also adhered to the face layer 61 of plastic material. As the plied material reaches the bight of rollers 69, 70 the layer 61 is impressed with a design 104 and the material is chilled as it is impressed. The material is then wound on rolls such as 76.

While the material on roll 31 has been mentioned as a plain sheet of plastic material, one face of the material may have been previously treated before entering the bight of rollers 10 and 17.

For example, the material on roll 31 may be a layer of paper having on at least one face thereof a layer of plastic material such as vinyl plastic, the surface of the paper adjacent the plastic layer being either coated or uncoated and being either printed or unprinted. The opposite face of the paper may be plain, resin impregnated, or adhesive coated. In some cases fabric might be substituted for the paper in which case the face of the fabric abutting the plastic layer would be coated with an additional layer of plastisol.

By controlling the variable speed changers the speed of the various mechanisms may be adjusted to obtain the most desirable results.

While a typical mechanism has been shown and described for illustrating the method, it will be understood that changes in construction of the mechanism may be made as long as the method of forming the laminates is preserved.

These and other variations may be made without departing from the scope of the invention as it is defined by the following claims.

I claim:

1. Apparatus for forming a laminate including means for rotatably supporting a roll of plastic sheet, a pair of rolls adapted to engage the sheet and draw it continuously from the support means, a rubber cover on one of said rolls, variable speed means for driving said rubber covered roll, said other roll having a plurality of similar cavities in its face equally spaced triangularly with each other, means for adjustably pressing the rolls against each other, means for supplying adhesive to the cavities for deposit on the sheet, the cavities being of a depth and spacing to apply adhesive over about one-half of the sheet surface, and to a depth of about three times the thickness of adhesive in the laminate, a means for continuously applying a web of woven textile fabric to the adhesive side of the sheet to spread the adhesive uniformly over the full surfaces between the sheet and web and to reduce it to about one-third of its applied thickness, a heating drum, adjustable speed means for rotating the drum, means for continuously applying a film of plastic more heat resistant than the sheet to the drum, means for continuously applying the sheet side of the combined sheet and web to the film after it has been carried over an arc of the drum to thereby form the laminate, and a pair of roll means progressively impressing the film side of the hot laminate as it leaves the drum with a design configuration and simultaneously chilling the laminate to set the impression.

2. Apparatus for forming a laminate including means for rotatably supporting a roll of plastic sheet, a pair of rolls adapted to engage the sheet and draw it continuously from the support means, means for driving said rolls, one of said rolls having a plurality of similar cavities in its face equally spaced with each other, means for supplying adhesive to the cavities for deposit on the sheet, the cavities being of a depth and spacing to apply adhesive over about one-half of the sheet surface, and to a depth of about three times the thickness of adhesive in the laminate, means for continuously applying a web of woven textile fabric to the adhesive side of the sheet to spread the adhesive uniformly over the full surfaces between the sheet and web and to reduce it to about one-third of its applied thickness, a heating drum, adjustable speed means for rotating the drum, means for continuously applying a film of plastic more heat resistant than the sheet to the drum, means for continuously applying the sheet side of the combined sheet and web to the film after it has been carried over an arc of the drum to thereby form the laminate, and a pair of roll means progressively impressing the film side of the hot laminate as its leaves the drum with a design configuration and simultaneously chilling the laminate to set the impression.

3. Apparatus for forming a laminate including means for rotatably supporting a roll of plastic sheet, a pair of rolls adapted to engage the sheet and draw it continuously from the support means, means for driving said rolls, one of the rolls having a plurality of similar cavities in its face equally spaced with each other, means for supplying adhesive to the cavities for deposit on the sheet, the cavities being of a depth and spacing to apply adhesive over about one-half of the sheet surface, means for continuously applying a web of woven textile fabric to the adhesive side of the sheet to spread the adhesive uniformly over the full surfaces between the sheet and web, a heating drum, means for rotating the drum, means continuously applying the sheet side of the combined sheet and web to the film of plastic on the drum to thereby form the laminate, and a pair of roll means progressively impressing the film side of the hot laminate as it leaves the drum with a design configuration and simultaneously chilling the laminate to set the impression.

References Cited in the file of this patent

UNITED STATES PATENTS

| | | |
|---|---|---|
| 2,129,929 | Gurwick | Sept. 13, 1938 |
| 2,427,513 | Spessard | Sept. 16, 1947 |
| 2,531,036 | Goettsch | Nov. 21, 1950 |
| 2,698,574 | Dougherty et al. | Jan. 4, 1955 |
| 2,706,699 | Plansoen et al. | Apr. 19, 1955 |
| 2,732,324 | Morris | Jan. 24, 1956 |